United States Patent [19]
Weaver

[11] 3,837,871

[45] Sept. 24, 1974

[54] HEXAGONAL SILICON ALUMINUM OXYNITRIDE

[75] Inventor: Gerald Q. Weaver, Worcester, Mass.

[73] Assignee: Norton Company, Worcester, Mass.

[22] Filed: Apr. 24, 1972

[21] Appl. No.: 246,818

[52] U.S. Cl............................ 106/65, 106/44, 106/55
[51] Int. Cl........................ C04b 35/56, C04b 35/58
[58] Field of Search.......... 106/55, 65, 44; 29/182.5

[56] References Cited
UNITED STATES PATENTS

| | | | |
|---|---|---|---|
| 3,262,761 | 7/1966 | Bechtold | 106/65 |
| 3,356,513 | 12/1967 | Washburn | 106/55 |

*Primary Examiner*—James E. Poer
*Attorney, Agent, or Firm*—Oliver W. Hayes

[57] ABSTRACT

The quaternary compound silicon aluminum oxynitride having a hexagonal phenacite crystal structure is described. The quaternary compound is formed by reacting silicon oxynitride with an appreciable percentage of aluminum. The percent of the product which is converted to the hexagonal quaternary compound is believed to be about 6 times the percentage of aluminum in the product, up to about 15 parts Al/100 parts $Si_2ON_2$ when the silicon oxynitride in the product is largely converted to cthe hexagonal quaternary compound $Si_{2-x}Al_xON_2$. As more aluminum is added, the relative proportions of aluminum and silicon in the compound seem to change until the formula $SiAlON_2$ is reached at which point no additional aluminum can be accommodated in the crystal lattice. When the mixture is hot processed, the product has high strength and less than about 1 percent porosity. The process of making this novel product is also described.

9 Claims, 2 Drawing Figures

HEXAGONAL SILICON ALUMINUM OXYNITRIDE

BACKGROUND OF THE INVENTION AND PRIOR ART

Silicon oxynitride has been known for some time and while its excellent properties have been recognized for a number of years (Forgeng et al., U.S. Pat. No. 2,968,530, Washburn U.S. Pat. No. 3,356,513 and American Ceramics Society Bulletin, Vol. 46, No. 7, pages 667–671, 1967), it has not achieved its commercial potential because of the difficulty in forming the product to a density greater than about 95 percent of theoretical. In the above-mentioned Washburn patent and the Ceramics Society Bulletin, a technique is described wherein a product consisting predominantly of silicon oxynitride and about 0.3 to 5 weight percent of alkaline earth oxide is hot pressed to a density which is about 95 percent of theoretical density. There is still, however, in the Washburn product about 5 percent porosity. The Washburn product (as described in his patent and in the American Ceramic Society Bulletin) is believed to be largely orthorhombic, although there does seem to be some indication of a certain amount of beta silicon nitride as an impurity. Some additional work involving mixtures of aluminum, silicon, nitrogen and oxygen has been found in the patent literature. For example, British Pat. No. 970,639, Sept. 23, 1964 (Plessey Co.) described the addition of up to 25 percent $Al_2O_3$ as a "fluxing agent" to $Si_3N_4$ with hot pressing of the mixture. This $Al_2O_3$ containing product was inferior to one made by using magnesium oxide as the "fluxing agent." Similarly, U.S. Pat. No. 3,262,761 discusses the reaction of aluminum with $Si_3N_4$ in the presence of oxygen to obtain a composition containing all of these elements in varying degrees of combination. None of this prior art describes the quaternary compound silicon aluminum oxynitride which is produced in the present invention.

BRIEF SUMMARY OF THE PRESENT INVENTION

Silicon oxynitride ($Si_2ON_2$) of the general type described in the Washburn publications, having minimal 0.1 percent (or less) calcium oxide, is hot pressed in the presence of varying amounts of added aluminum. X-ray analysis of the hot pressed product reveals the presence of a substantial amount of what is believed to be the quaternary compound silicon aluminum oxynitride ($Si_{2-x}Al_xON_2$). This quaternary compound has an hexagonal structure similar to that of Beta $Si_3N_4$ but with an expanded crystal lattice. It has been found that, as the amount of aluminum is increased over the range 5 parts Al to 15 parts Al per 100 parts (by weight) $Si_2ON_2$, the percent of hexagonal quaternary compound in the hot pressed products appear to be about 6 times the weight percentage of aluminum in the product. At about 15 parts added aluminum essentially all of the silicon oxynitride in the hot pressed product appears by X-ray diffraction to be converted to the hexagonal quaternary compound $Si_{2-x}Al_xON_2$. This product, even with concentrations of aluminum as low as 5 parts/100 parts, or less, $Si_2ON_2$, when hot pressed, gives a porosity less than 1 percent and a strength of about 67,000 psi as compared to 30,000 psi for the product described in Example XII in the Washburn patent.

The lattice parameters of the compound of the present invention, when indexed in the hexagonal system, appear to increase in a straight line fashion as a function of aluminum concentration. At a concentration of aluminum corresponding approximately to the formula $SiAlON_2$, the lattice parameters appear to be stabilized at $a = 7.685A$ and $o = 2.984A$. This expanding lattice parameter phenomenon is a direct function of the aluminum concentration as shown in FIGS. 1 and 2, which are plots of calculated lattice parameters, FIG. 1 showing calculated $a$ parameter as a function of aluminum concentration by weight and FIG. 2 being the equivalent for the $c$ parameter. On each table there are five data points. Data points I, II, III and IV correspond to the data tabulated hereinafter in Tables I, II, III and IV. Data points V are the lattice parameters for beta silicon nitride. On FIGS. 1 and 2, the composition of $SiAlON_2$ is indicated and the remarkable correspondence between this composition and the break in the curve of increasing lattice parameters is demonstrated. At composition IV, it is believed that all of the aluminum that can be accommodated by the crystal lattice has been incorporated and that the additional aluminum added to the mixture has gone toward formation of another compound whose structure and composition has not been fully determined.

It is somewhat surprising that this compound $Si_{2-x}Al_xON_2$, while containing two different cations, can be indexed on this small cell (used for $\beta Si_3N_4$ and $Ge_3N_4$) as opposed to the large cell normally used for phenacite ($Be_2SiO_4$ type materials).

These are related by
$a$ phenacite type = $\sqrt{3} \times a \, \beta \, Si_3N_4$ type, and
$c$ phenacite type = $3 \times c \, \beta \, Si_3N_4$ type

DETAILED DESCRIPTION

Figure 1:
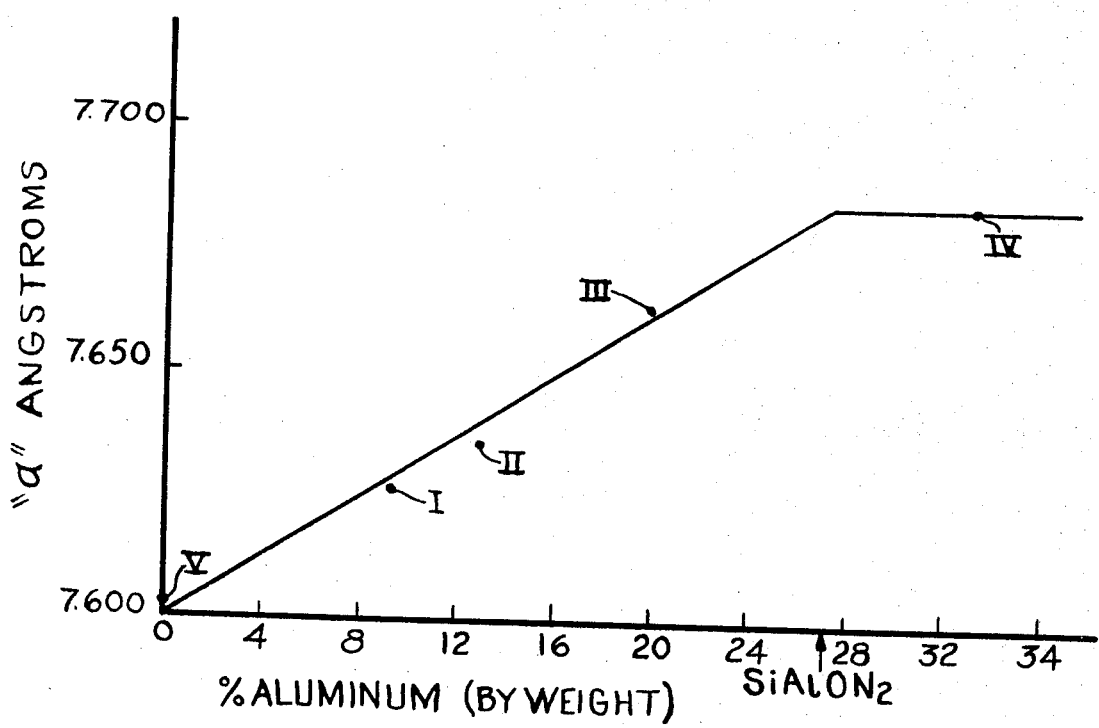
Figure 2:
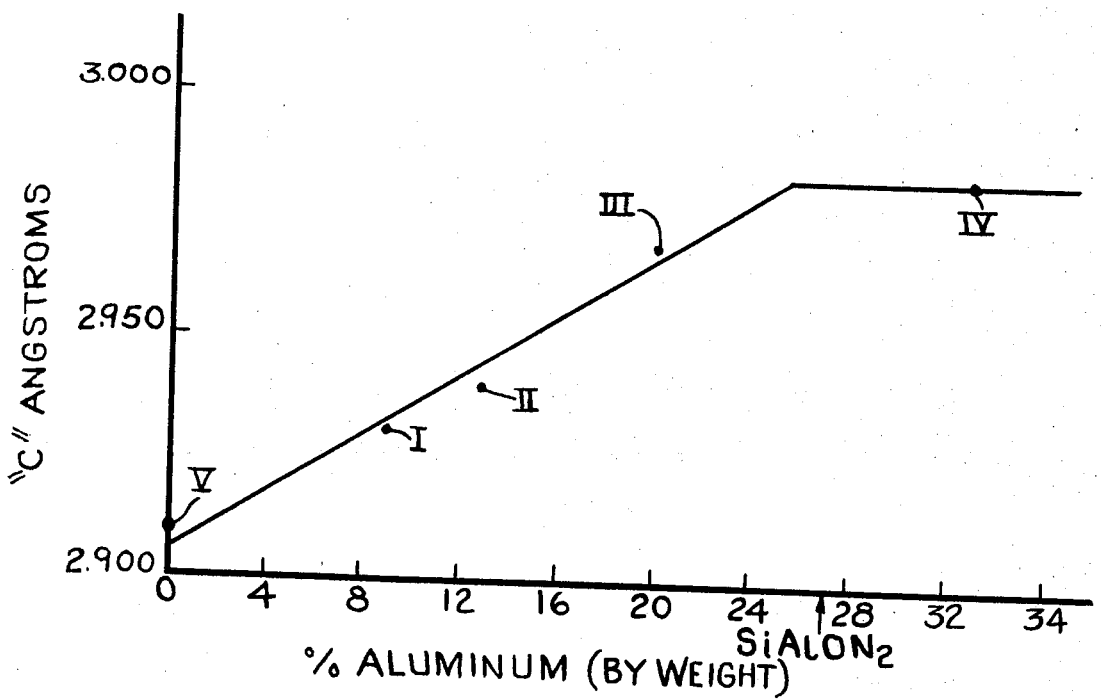

The starting material for the present invention is preferably silicon oxynitride powder prepared in accordance with the procedure outlined in Washburn U.S. Pat. No. 3,356,513, with a minimum amount of alkaline earth oxide. In a preferred form, the silicon oxynitride has about 0.1 percent or less of CaO and is placed in a ball mill with finely divided aluminum metal. The silicon oxynitride is of relatively high purity, at least 90 percent (preferably 95 percent) $Si_2ON_2$ and is in the form of a very fine powder, e.g., about 2 microns. The aluminum has a particle size on the order of 4.5 microns and has a purity of 99 percent and is an atomized powder of low oxygen content. The mill is preferably lined with tungsten carbide and uses tungsten carbide balls. After milling for about 10 hours under a liquid, such as isopropanol, the powder is removed, the isopropanol is evaporated and the powder is loaded into a graphite mold. The powder is subjected to simultaneous application of heat and pressure (for example, 3,500 psi at a temperature of 1,750°C) with a 5 minute hold at the maximum temperature and pressure, to produce the hot pressed product.

In the above general description of the invention, no mention has been made of the specific percentage of aluminum added to the silicon oxynitride powder prior to the ball milling. The amount of aluminum that can be used can vary between about 1 percent to as high as 50 weight percent of the total mixture. While the exact role of the aluminum has not been precisely determined, it is believed that the aluminum actually enters the silicon oxynitride crystal structure as a substitution for one of the two silicon atoms. When only a small amount of aluminum is added to the mixture, it is believed that this substitution is limited to the surface because of diffusional effects. However, even with a small quantity of aluminum, as low as 2 percent, there seems to be a considerable densification which is substantially greater than can be achieved by the use of an alkaline earth oxide as described in the above-mentioned Washburn patent. This densification is probably achieved by diffusional bonding of at least a surface layer of the individual $Si_2ON_2$ grains as the result of aluminum substitution for the silicon in the surface layer of the grains with a possible partial conversion of a portion of the crystal to the hexagonal aluminum silicon oxynitride phase.

When a substantial percentage of aluminum, e.g., 10 parts/100 parts is added to the $Si_2ON_2$, a substantial percentage of the $Si_2ON_2$ appears to be converted to an aluminum silicon oxynitride composition having a hexagonal structure.

This reaction is believed to be $$x\ Al + Si_2ON_2 \rightarrow Si_{2-x}Al_xON_2 + x\ Si$$

In order to eliminate the free silicon phase and thus increase the strength and high temperature capabilities of this material, one can react the silicon in situ with numerous materials (e.g., carbon, nitrogen, boron, etc.), or one can remove the silicon by a $HNO_3$—$HF$ leaching, for example.

As mentioned previously, it is believed that the maximum amount of aluminum that can be accommodated in the crystal lattice is that corresponding to the empirical formula $SiAlON_2$. When more aluminum is added to the mixture, it is believed that another aluminum compound is formed with the excess aluminum. While the structure of this compound has not been determined, there is some indication that it has a formula close to $Al_4SiN_4$ since it appears to be isostructural with $Al_4SiC_4$ by X-ray diffraction measurements.

In order that the invention may be more completely understood, a preferred method of practicing the invention is set forth in Example I below.

EXAMPLE I

Silicon oxynitride powder having the following properties was used as a starting material: 95% $Si_2ON_2$, remainder $SiO_2$ and $\beta\ Si_3N_4$, 2 $\mu$ average particle size, about 0.1% CaO. 200 grams of this powder was mixed with 10 grams of aluminum having the following properties: Atomized Al powder 99+% pure, 4.5$\mu$ average particle size, low oxygen content, of the type normally used as rocket fuel. The mixture was added to a one quart tungsten carbide lined ball mill containing tungsten carbide balls. 450 ccs of isopropanol was added and the mixture was milled for approximately 20 hours. The slurry was removed, the alcohol was driven off by heating to about 90°C. and the dried powder was screened through a 40-mesh screen. 10 grams of this powder was then loaded into a graphite mold of 1 inch ID and 3 inches long. Graphite plungers were placed in the mold and the powder was subjected to simultaneous heat and pressure in accordance with the following schedule: Room temperature to 1,200°C. pressure increased from about 100 psi to 3,000 psi. Pressure held constant at 3,000 psi while temperature raised to 1,780°C. When the furnace had cooled, the piece was removed from the mold and was tested for strength, density, chemical composition and crystal structure. Test results are set forth below:

| | |
|---|---|
| Cross bending strength | 67,000 psi (average of 40 tests) |
| Density | 3.10 gm/cc |
| Phase composition by X-ray diffraction | $Si_2ON_2$ + hexagonal (phenacite) material |

EXAMPLE II

A specific example of the reaction of the displaced silicon with carbon is as follows: a mixture of 200 grams $Si_2ON_2$ + 50 grams aluminum was milled in a WC mill under isopropanol as previously described. To 25 grams of this unfired blended material was added 12 grams of Quaker Oats Fapreg P5 (a furfuryl alcohol diluted furfural resin) having a char yield of approximately 60 percent. This material was mixed for 25 minutes in a small "lightning" mixer and then 75 grams of 150 grit SiC was also added. This mixture was then mixed for approximately 1 hour to form a "sludgy" mix. This was then removed from the mixer, air dried overnight and pressed into a 2 inches diameter pellet at 6,000 psi. This pellet was then fired in an induction heated graphite type furnace with an argon purge. Temperature was brought to 1,780°C. and held for about 5 minutes, total run time about 1 hour. X-ray results on the crushed pellet showed only SiC and the previously described phenacite type material indicating that all the metallic silicon released by the Al+$Si_2ON_2$ reaction had been converted by the carbon released from the furfuryl alcohol to SiC.

EXAMPLE III

A series of runs were made similar to the procedure set forth in Example I above but in these additional experiments, the amount of aluminum added to the silicon oxynitride powder was varied from 9 percent to 33 percent by weight (of the total mixture). In Tables I, II, III and IV below, there are set forth the test results from the various different runs. In these runs, the lattice spacing $d$ is measured for the various hkl planes (Miller indices) indicated in the tables. While other reflections were present and could be indexed using the expanded $\beta\ Si_3N_4$ structure, their intensity was too low to provide accurate $d$ spacing information using X-ray diffractometry. From the measured $d$ spacings (indicated in the tables) a set of lattice parameters was calculated using an iterative computer procedure. The listed $d$ theoretical is that value calculated from the best fit set of lattice parameters.

TABLE I $Si_2ON_2$ + 9.1% (by weight) Al x = .355 in $Si_{2-x}Al_xON_2$

| d Measured | hkl | d Theoretical | (for a=7.627 and c=2.931) |
|---|---|---|---|
| 1.3461 | 321 | 1.3461 | |
| 1.4412 | 410 | 1.4414 | |
| 1.4660 | 002 | 1.4655 | |
| 1.5158 | 320 | 1.5153 | |
| 1.5565 | 311 | 1.5535 | |
| 1.5976 | 221 | 1.5983 | |
| 1.7603 | 301 | 1.7604 | |
| 1.8314 | 310 | 1.8320 | |
| 2.1904 | 201 | 2.1922 | |
| 2.4954 | 210 | 2.4965 | |
| 2.6758 | 101 | 2.6791 | |

Other species identified by X-ray diffraction
$Si_2ON_2$ and $WSi_2$ (from WC incorporated during milling)

TABLE II $Si_2ON_2$ + 13.0 (by weight) Al x = .536 in $Si_{2-x}Al_xON_2$

| d Measured | hkl | d Theoretical | (for a=7.636 and c=2.940) |
|---|---|---|---|
| 1.2670 | 212 | 1.2671 | |
| 1.2730 | 330 | 1.2727 | |
| 1.2962 | 411 | 1.2954 | |
| 1.3485 | 321 | 1.3482 | |
| 1.4427 | 410 | 1.4431 | |
| 1.4688 | 002 | 1.4700 | |
| 1.5172 | 320 | 1.5171 | |
| 1.5556 | 311 | 1.5561 | |
| 1.7628 | 301 | 1.7636 | |
| 1.8335 | 310 | 1.8341 | |
| 1.9037 | 211 | 1.9043 | |
| 1.9141 | 220 | 1.9090 | |
| 2.1948 | 201 | 2.1971 | |
| 2.3280 | 111 | 2.3294 | |
| 2.4981 | 210 | 2.4995 | |
| 2.6834 | 101 | 2.6865 | |

Other species identified by X-ray diffraction
$Si_2ON_2$ (very weak) and Si.

TABLE III $Si_2ON_3$ + 20.0% (by weight) Al x = .715 in $Si_{2-x}Al_xON_2$

| d Measured | hkl | d Theoretical | (for a=7.663 and c=2.970) |
|---|---|---|---|
| 1.1562 | 312 | 1.1557 | |
| 1.2781 | 212 | 1.2779 | |
| 1.3026 | 411 | 1.3017 | |
| 1.3558 | 321 | 1.3548 | |
| 1.4489 | 410 | 1.4482 | |
| 1.4839 | 002 | 1.4850 | |
| 1.5231 | 320 | 1.5225 | |
| 1.5644 | 311 | 1.5645 | |
| 1.6094 | 221 | 1.6099 | |
| 1.7742 | 301 | 1.7741 | |
| 1.8400 | 310 | 1.8406 | |
| 2.2110 | 201 | 2.2130 | |
| 2.5039 | 210 | 2.5083 | |
| 2.7023 | 101 | 2.7109 | |

Other species identified by X-ray diffraction
Si

TABLE IV $Si_2ON_2$ + 33.3 (by weight) Al x = 1.787 in $Si_{2-x}Al_xON_2$

| d Measured | hkl | d Theoretical | (for a=7.685 and c=2.984) |
|---|---|---|---|
| 1.3053 | 411 | 1.3059 | |
| 1.4925 | 002 | 1.4920 | |
| 1.5259 | 320 | 1.5268 | |
| 1.6148 | 221 | 1.6154 | |
| 1.7798 | 301 | 1.7803 | |
| 1.8447 | 310 | 1.8459 | |
| 2.2214 | 201 | 2.2216 | |
| 2.5139 | 210 | 2.5155 | |
| 2.7233 | 101 | 2.7228 | |

Other species identified by X-ray diffraction
Si + an unknown compound thought to be $Si_xAl_yN_z$ The novel products of this invention have utility, for example, as high strength parts such as turbine vanes for use in high temperature environments.

What is claimed is:

1. A dense product consisting predominantly of (a) silicon oxynitride, (b) a quaternary compound of silicon, aluminum, oxygen and nitrogen having the hexagonal phenacite structure, and (c) silicon, in the form of free silicon or combined silicon, at least equal to the weight of aluminum in the quaternary compound.

2. A dense product consisting predominantly of (a) a quaternary compound of silicon, aluminum, oxygen and nitrogen having the approximate formula $Si_{2-x}Al_x ON_2$ and the hexagonal phenacite structure, and (b) an amount of silicon, in the form of free silicon or combined silicon, at least equal to the weight of aluminum in the quaternary compound.

3. A dense product consisting predominantly of the quaternary compound of silicon, aluminum, oxygen and nitrogen, having the approximate formula $SiAlON_2$, and silicon, in the form of free silicon or combined silicon, at least equal to the weight of aluminum in the quaternary compound.

4. The product of claim 1 wherein the silicon is in the form of free silicon.

5. A dense product consisting predominantly of the quaternary compound of silicon, aluminum, oxygen and nitrogen having the approximate formula $Si_{2-x}Al_x ON_2$ and a hexagonal phenacite structure.

6. A dense product consisting predominantly of silicon carbide and the reaction product of aluminum and silicon oxynitride having a hexagonal phenacite structure.

7. A dense product consisting predominantly of a quaternary compound of silicon, aluminum, oxygen and nitrogen having a hexagonal phenacite structure and having the following d spacings as measured by X-ray diffractometry:

| d Measured | hkl |
|---|---|
| 1.3053 | 411 |
| 1.4925 | 002 |
| 1.5259 | 320 |
| 1.6148 | 221 |
| 1.7798 | 301 |
| 1.8447 | 310 |
| 2.2214 | 201 |
| 2.5139 | 210 |
| 2.7233 | 101 |

8. A process of forming a dense refractory product which comprises adding aluminum powder to silicon oxynitride powder thoroughly mixing said powders and reacting a compacted mass of the mixture for a sufficient time to cause a substantial portion of said aluminum to be completely reacted with the silicon oxynitride.

9. The process of claim 8 wherein the silicon which is a by-product of the aluminum plus silicon oxynitride reaction is reacted with carbon to form silicon carbide.

* * * * *

UNITED STATES PATENT OFFICE
CERTIFICATE OF CORRECTION

Patent No. 3,837,871　　　　　　　　　Dated September 24, 1974

Inventor(s) Gerald O. Weaver

It is certified that error appears in the above-identified patent and that said Letters Patent are hereby corrected as shown below:

Columns 2, line 7: "a = 7.685A and o = 2.984A"

should read - a = 7.685A and c = 2.984A -

Column 4, line 5: "(average of 40 tests)" should read - (average of 4 tests) -

Signed and sealed this 18th day of March 1975.

(SEAL)
Attest:

RUTH C. MASON
Attesting Officer

C. MARSHALL DANN
Commissioner of Patents
and Trademarks